United States Patent
Maxilom et al.

(10) Patent No.: US 12,499,447 B2
(45) Date of Patent: Dec. 16, 2025

(54) FRICTIONLESS AND UNASSISTED RETURN PROCESSING

(71) Applicant: NCR Voyix Corporation, Atlanta, GA (US)

(72) Inventors: Chario Bardoquillo Maxilom, Ibabao Cordova (PH); Ferdinand Salarda Acedera, Cebu (PH); John Wilte Go Mabute, Umapad Mandaue (PH)

(73) Assignee: NCR Voyix Corporation, Atlanta, GA (US)

( * ) Notice: Subject to any disclaimer, the term of this patent is extended or adjusted under 35 U.S.C. 154(b) by 227 days.

(21) Appl. No.: 17/541,519

(22) Filed: Dec. 3, 2021

(65) Prior Publication Data

US 2022/0092597 A1 Mar. 24, 2022

Related U.S. Application Data

(62) Division of application No. 16/368,372, filed on Mar. 28, 2019.

(51) Int. Cl.
*G06Q 20/40* (2012.01)
*G06Q 30/016* (2023.01)

(52) U.S. Cl.
CPC ..... *G06Q 20/407* (2013.01); *G06Q 20/40145* (2013.01); *G06Q 30/016* (2013.01)

(58) Field of Classification Search
CPC ....... G06Q 20/20; G06Q 30/02; H04L 67/306
See application file for complete search history.

(56) References Cited

U.S. PATENT DOCUMENTS

| 7,333,953 B1 | 2/2008 | Banaugh et al. |
| 7,516,888 B1 | 4/2009 | Kundu et al. |
| 8,311,895 B1 | 11/2012 | Murugan et al. |

(Continued)

FOREIGN PATENT DOCUMENTS

JP 2009230465 A * 10/2009

OTHER PUBLICATIONS

"U.S. Appl. No. 16/368,372, Advisory Action mailed Mar. 8, 2022", 2 pgs.

(Continued)

*Primary Examiner* — Patrick Mcatee
*Assistant Examiner* — Sima Asgari
(74) *Attorney, Agent, or Firm* — Schwegman Lundberg & Woessner, P.A.

(57) ABSTRACT

Images capture an object that a person carries into a frictionless store as a potential frictionless return item. When the potential frictionless return item is placed on a shelf or a countertop in a designated area, the potential frictionless return item is identified as a returned item. A transaction history linked to an account of the person is retrieved and the returned item matched to a previously purchased item in the transaction history. Assuming return conditions are met, the account is automatically credited an item price associated with the previously purchased item and a user interface is automatically initiated on a registered mobile device of the person providing a receipt for the refund and the return. The person may then leave the store or continue shopping in the frictionless store and the person and any items taken by the person are tracked for frictionless purchase.

11 Claims, 4 Drawing Sheets

(56) References Cited

U.S. PATENT DOCUMENTS

| | | | |
|---|---|---|---|
| 9,904,946 B2* | 2/2018 | Ellison | G06Q 30/0631 |
| 10,762,467 B2 | 9/2020 | Harada et al. | |
| 11,030,442 B1 | 6/2021 | Bergamo et al. | |
| 2002/0184106 A1* | 12/2002 | Christensen | G06Q 30/06 |
| | | | 705/26.8 |
| 2003/0126033 A1 | 7/2003 | Evans et al. | |
| 2005/0104727 A1 | 5/2005 | Han et al. | |
| 2006/0041591 A1 | 2/2006 | Rhoads | |
| 2008/0249865 A1* | 10/2008 | Angell | G06Q 30/0277 |
| | | | 705/14.51 |
| 2014/0316919 A1 | 10/2014 | Li et al. | |
| 2014/0333761 A1 | 11/2014 | Porter | |
| 2015/0036020 A1 | 2/2015 | Shehane et al. | |
| 2015/0039621 A1 | 2/2015 | Mikolajczyk et al. | |
| 2015/0248589 A1 | 9/2015 | Broache et al. | |
| 2015/0310459 A1* | 10/2015 | Bernal | G06Q 30/0201 |
| | | | 705/7.29 |
| 2016/0042351 A1 | 2/2016 | Syed et al. | |
| 2016/0086206 A1 | 3/2016 | Churchill et al. | |
| 2016/0117344 A1 | 4/2016 | Kleinpeter et al. | |
| 2018/0018508 A1* | 1/2018 | Tusch | G06V 20/52 |
| 2018/0047006 A1 | 2/2018 | Johnson et al. | |
| 2018/0365668 A1* | 12/2018 | Hay | G06Q 20/20 |
| 2019/0066169 A1* | 2/2019 | Costello | H04N 7/181 |
| 2019/0066190 A1* | 2/2019 | Pedroso | G06Q 30/0633 |
| 2019/0141021 A1* | 5/2019 | Isaacson | G06Q 30/0625 |
| 2019/0213573 A1* | 7/2019 | Zelten | G06Q 20/407 |
| 2019/0279017 A1 | 9/2019 | Graham et al. | |

OTHER PUBLICATIONS

"U.S. Appl. No. 16/368,372, Advisory Action mailed Aug. 28, 2023", 3 pgs.

"U.S. Appl. No. 16/368,372, Advisory Action mailed Oct. 17, 2022", 3 pgs.

"U.S. Appl. No. 16/368,372, Final Office Action mailed Jun. 27, 2023", 19 pgs.

"U.S. Appl. No. 16/368,372, Final Office Action mailed Aug. 5, 2022", 14 pgs.

"U.S. Appl. No. 16/368,372, Final Office Action mailed Dec. 9, 2021", 17 pgs.

"U.S. Appl. No. 16/368,372, Non Final Office Action mailed Mar. 30, 2022", 14 pgs.

"U.S. Appl. No. 16/368,372, Non Final Office Action mailed Jun. 10, 2021", 17 pgs.

"U.S. Appl. No. 16/368,372, Non Final Office Action mailed Dec. 1, 2023", 21 pgs.

"U.S. Appl. No. 16/368,372, Non Final Office Action mailed Dec. 20, 2022", 17 pgs.

"U.S. Appl. No. 16/368,372, Response filed Feb. 9, 2022 to Final Office Action mailed Dec. 9, 2021", 9 pgs.

"U.S. Appl. No. 16/368,372, Response filed Mar. 18, 2021 to Restriction Requirement mailed Jan. 21, 2021", 9 pgs.

"U.S. Appl. No. 16/368,372, Response filed Mar. 20, 2023 to Non Final Office Action mailed Dec. 20, 2022", 10 pgs.

"U.S. Appl. No. 16/368,372, Response filed Jun. 30, 2022 to Non Final Office Action mailed Mar. 30, 2022", 10 pgs.

"U.S. Appl. No. 16/368,372, Response filed Aug. 7, 2023 to Final Office Action mailed Jun. 27, 2023", 10 pgs.

"U.S. Appl. No. 16/368,372, Response filed Sep. 7, 2021 to Non Final Office Action mailed Jun. 10, 2021", 9 pgs.

"U.S. Appl. No. 16/368,372, Response filed Sep. 27, 2023 to Advisory Action mailed Aug. 28, 2023", 8 pgs.

"U.S. Appl. No. 16/368,372, Response filed Oct. 5, 2022 to Final Office Action mailed Aug. 5, 2022", 9 pgs.

"U.S. Appl. No. 16/368,372, Response filed Nov. 4, 2022 to Advisory Action mailed Oct. 17, 2022", 10 pgs.

"U.S. Appl. No. 16/368,372, Restriction Requirement mailed Jan. 21, 2021", 8 pgs.

* cited by examiner

FRICTIONLESS AND UNASSISTED RETURN PROCESSING

CROSS-REFERENCE TO RELATED APPLICATION

This application is a division of U.S. patent application Ser. No. 16/368,372, filed Mar. 28, 2019, which application and publication is incorporated herein by reference in its entirety.

BACKGROUND

Recent advancements in image processing has permitted retailers to provide a frictionless shopping experience to its consumers. In a frictionless store, an individual is allowed to check in with a store electronically, browse for items to purchase, place items in bags/carts, and exit the store without any interaction with a store agent or with a checkout station. The items that the individual possesses when leaving the store are recognized through image processing and an account associated with the individual is automatically charged for the price of the items. This allows for quick and easy shopping and is referred to as a frictionless store or frictionless shopping because the consumer does not have to interact with any agent of the store or any terminal of the store to purchase items.

However, the industry has been unable to provide a true frictionless experience to the consumers because there are a variety of situations that still require consumer interaction with a human assistant.

On such situation, is associated with consumer returns and refunds, which still require the returned item to be manually inspected, scanned, and a consumer receipt inspected. Virtually all other aspects associated with shopping have experienced automation and deployment of new technologies but the refund and return practices have not benefited in any significant degree and have generally remained the same manual consumer experience that requires human assistants to process.

Thus, there is a need for frictionless and unassisted return and refund techniques that allow consumers to return items and receive refunds without assistance.

SUMMARY

In various embodiments, methods and a system for frictionless and unassisted refund processing are presented.

According to an embodiment, a method for frictionless and unassisted refund processing is presented. A consumer and an item that is placed in a designated area of a store by the consumer are identified. A transaction history is obtained for the consumer. The item is matched to a previously purchased item in the transaction history. An account of the consumer is credited with an item price associated with the previously purchased item as a refund for the item.

DETAILED DESCRIPTION

Figure 1:
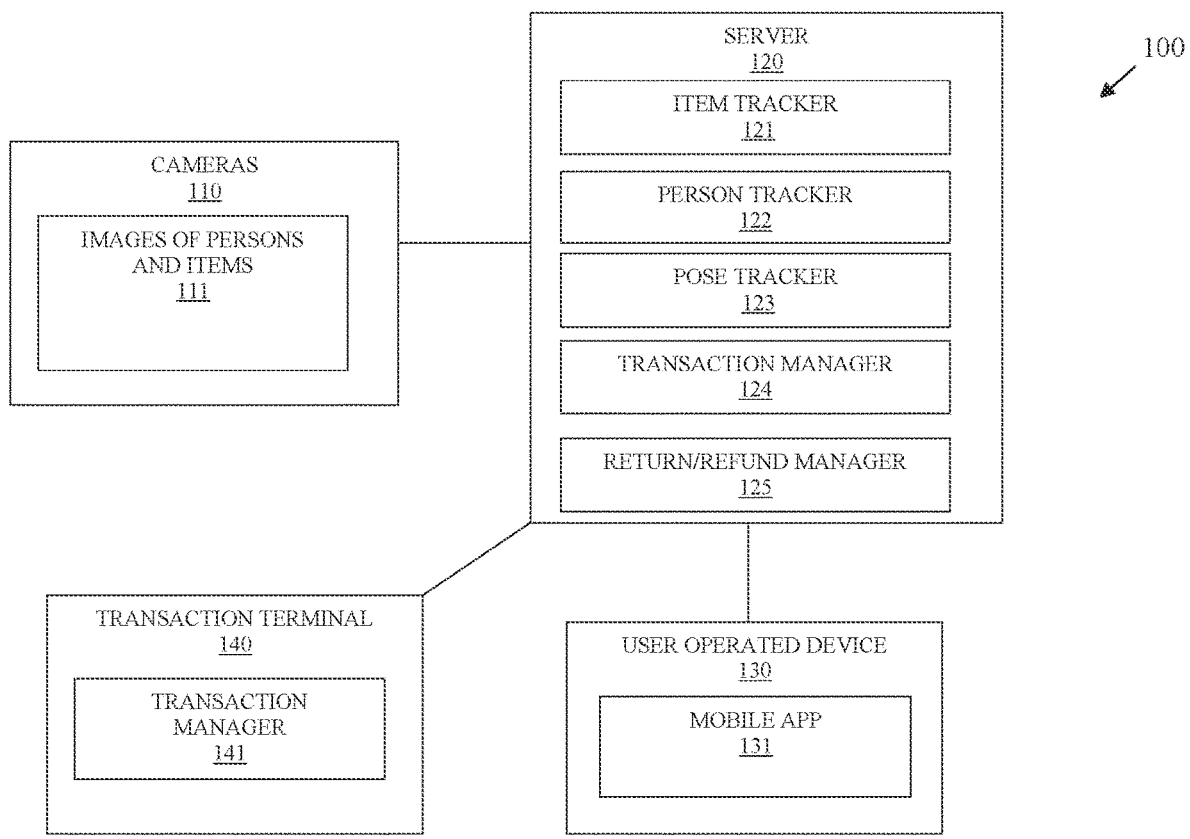
FIG. 1 is a diagram of a system for frictionless and unassisted refund processing, according to an example embodiment.

FIG. 1 is a diagram of a system 100 for frictionless and unassisted refund processing, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of frictionless and unassisted refund processing, presented herein and below.

As used herein and below, the terms "customer," "consumer," "shopper," and "user" may be used interchangeably and synonymously.

The system 100 includes a plurality of cameras 110 that capture images of persons and items (herein after just "defined area images 111"). The system also includes a server 120, a user-operated device 130 having a mobile application ("app") 131, and one or transaction terminals 140 having a transaction manager 141. The server 120 includes executable instructions that execute on one or more hardware processors of the server 120 from a non-transitory computer-readable storage medium as: an item tracker 121, a person tracker 122, a pose tracker 123, a transaction manager 124, and a return/refund manager 125. The user operated device 130 also includes a processor and non-transitory computer-readable media having executable instructions representing the mobile app 131. Similarly, the transaction terminal 140 includes a processor and non-transitory computer-readable storage media having executable instructions representing the transaction manager 141.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 begin capturing the time-stamped images 111 in frames. Each image 111 represents a frame in a stream of images. Multiple frames per second are captured by each of the cameras 110.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the pose tracker 123. In an embodiment, some of the images when streamed from the cameras 110 can be buffered or cached in memory of cache and made accessible from the memory or cache to the item tracker 121, the person tracker 122, and the pose tracker 123.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

In an embodiment, the person tracker 122 is configured for facial recognition for a unique person present in the store but does not know an actual identity for the person. That is, the person may be unregistered but still uniquely tracked through unique facial attributes assigned to the unregistered person.

The identity of the person can be identified through registered facial features and or through a check-in process performed automatically or semi-automatically by the person. Such check-in processes can include the mobile app 131 reporting a location of the mobile device 130 that is identified as being the frictionless store; scanning a bar code upon entry of the frictionless store by the mobile device 130; carrying of store-issued key fob that transmits a wireless signal to a sensor upon entry of the person into the store; and others.

A person can be tracked by the person tracker 122 until an event or an image allows the person tracker 122 to assign an identity to a specific registered consumer of the store and matches that person to a consumer account.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc. Once enough confidence in the metadata is known for an unknown item, the item is identified and assigned item level details for a known item.

When an individual enters a frictionless store or a traditional store equipped in some areas with a frictionless store, the person tracker 122 interacts with the transaction manager 124 and assigns a transaction identifier for a transaction with the person. The person tracker 122 is responsible for tracking the person from frame to frame. The item tracker 121 identifies items and item identifiers possessed by the person when held, placed in a bag, or placed in a cart. The item identifier is provided to the transaction manager 124. The transaction manager 124 obtains the item pricing and description using the item identifier and adds the item pricing and description to the transaction associated with the assigned transaction identifier.

When the person is identified as entering the store through the images 111 and carrying a bag or an item, the refund manager 125 is notified with the person's identifier and as soon as the person is capable of being linked to a registered consumer account from the images or through some automated check-in technique (as discussed above), the person tracker 122 provides the registered consumer account number that is associated with the tracked person that is identified as having brought a potential item as a return into the store. The return/refund manager 125 then interacts with the item tracker 121, the person tracker 122, the pose tracker 123, and the transaction manager 124 for monitoring actions of the person, the location of the person within the store, and identifying the item being carried by the person, which was brought into the store and was being carried by the person either in a concealed bag or in a hand of the person.

The pose tracker 123 utilizes the bounding box and attributes associated with the person that are produced and maintained by the person tracker 122 to identify a direction or pose/limbs of the person in any given frame. The pose tracker 123 is also trained to identify limbs of the person and identify objects or potential items that are carried in the hands or in bags by the person through the person's identified hands and arms. The post tracker 123 assists the item tracker 121 in resolving the item or items carried into the store by the person in bags or in the hands of the person by tracking the limbs and the objects as potential items from frame to frames and interacting with the item tracker 121 to obtain an item identifier for the carried-in item.

In an embodiment, the pose tracker 123 includes a trained machine-learning algorithm that when passed a frame including a person being tracked returns an indication in metadata that identifies the arms and hands of the person and metadata for any object or potential item being carried by the person.

Once the person is identified and linked to a registered account and a determination is made by the pose tracker 123 that the person brought an unknown but tracked item into the store in his hands or in a bag, the return/refund manager 125 monitors the locations of the person within the store to determine from the images if the person is headed in a direction of a designated return and refund area of the store. In the interim, the return/refund manager 125 retrieves the transaction history for the registered consumer from a store database. The transaction history includes a listing of all items purchased and returned by the customer over some preconfigured period of time, such as one year.

As soon as the registered consumer is identified as being in the refund/return area of the store through the images and the person tracker 122, the return/refund manager 125 looks for an image with a clear view of the item being carried by the consumer. Signs or digital signs provide instructions to the consumer to remove the item from any bag and place it on a designated countertop where a clear image is captured by the cameras. The item tracker 121 is used to definitely identify the item as a specific store item code. The return/refund manager 125 inspects the transaction history for the consumer for the item code. When the item code is detected in the transaction history and when a refund policy associated with the store or the item itself is met (returned within a designated period of time from the initial purchase date of the item, includes in the image original package materials for the item, etc.), the return/refund manager 125 credits an item price associated with the item to the consumer account. The consumer may then leave the store with no assistance being required whatsoever for the return and refund. If a condition is not met for a return, the return/refund manager 125 uses a device identifier registered in a profile of the consumer account to send a message to an operating system (OS) of the device 130 to initiate and start the mobile app 131 on the user device 130. The condition not met is displayed in a user-facing interface of the app 131 to the user and the user is instructed to pick the item back up.

The app message may also be used to initiate the app 131 by the return/refund manager 125 to provide a receipt for a successful return and refund, which is displayed in real time to the consumer.

In an embodiment, the return/refund manager 125 may send messages to the user-facing interface of the app 131 that informs the consumer that the refund for the item can be obtained in a variety of manners, such as by crediting a credit card account that was used to originally purchase the item, crediting an in-store account, or obtain a cash refund. For any cash refund, the consumer is instructed through the user-facing interface to approach one of the in-store transaction terminals. As soon as the person tracker 122 identifies the consumer in front of a transaction terminal 140, the return/refund manager 125 causes a currency/coin dispenser to dispense a cash and coin amount from the currency/coin dispenser.

In an embodiment, the consumer may leave the return area and shop in the frictionless store after a successful frictionless and unassisted return and refund for the original returned item. In this scenario, the transaction manager 124 applies a credit amount associated with the refund to any total price for items purchased by the consumer following the return. If the consumer owes a registered account or payment method is charged the difference by the transaction manager 124 when the consumer exits the store.

In an embodiment, the consumer may shop within the store before returning the item. In this case, the item tracker 121, the person tracker 122, and the pose tracker 123 distinguishes and keeps track of the original item or bag that the consumer entered the store with so as to properly distinguish the item when it is brought and left in the refund and return area and processed by the return/refund manager 125. Any credit to the total transaction price is applied when the consumer exits the store by the transaction manager 124.

So, the consumer can return the item in the refund area completely unassisted and without any friction by simply leaving the item on a designated counter or shelf. The return can be before the consumer shops, while the consumer shops, after the consumer has completed shopping, or when the consumer did not shop at all and just entered and left the store after leaving the item on the designated shelf or counter.

The transaction manager 124 can check out any given person in a variety of manners. When the person tracker 122 has identified a customer and the customer is pre-registered with the store and has a registered payment method, then the transaction manager can process that payment method when the person is identified by the person tracker 122 as approaching or leaving an egress point of the store. When the person tracker 122 was unable to obtain the identity of the person (unregistered), the person can check out at a transaction terminal 140; the transaction manager 124 interacts with the transaction manager 141 that processes on the transaction terminal 140 and provides the shopping cart items for payment when the person tracker 122 identifies the person as being present at the transaction terminal 140. When the person (identified or unidentified) has a mobile application 131 downloaded to the person's user device 130, the transaction manager interacts with the mobile application 131 to present the items in the shopping cart and obtain payment from the person. Other approaches for checkout may be used as well, where the transaction manager 124 and the person tracker 122 cooperate to obtain payment for known persons (identity known) and for unknown persons (identity unknown) in frictionless manner, a semi-frictionless manner, or utilizing a transaction terminal 140 in an automated manner as discussed above through interaction of transaction manager 124 and transaction manager 141.

In an embodiment, the user-operated device 130 is one or more of: a phone, a tablet, a laptop, and a wearable processing device.

In an embodiment, the transaction terminal 140 is a Point-Of-Sale (POS) terminal or a Self-Service Terminal (SST).

These embodiments and other embodiments are now discussed with reference to the FIGS. 2-4.

Figure 2:
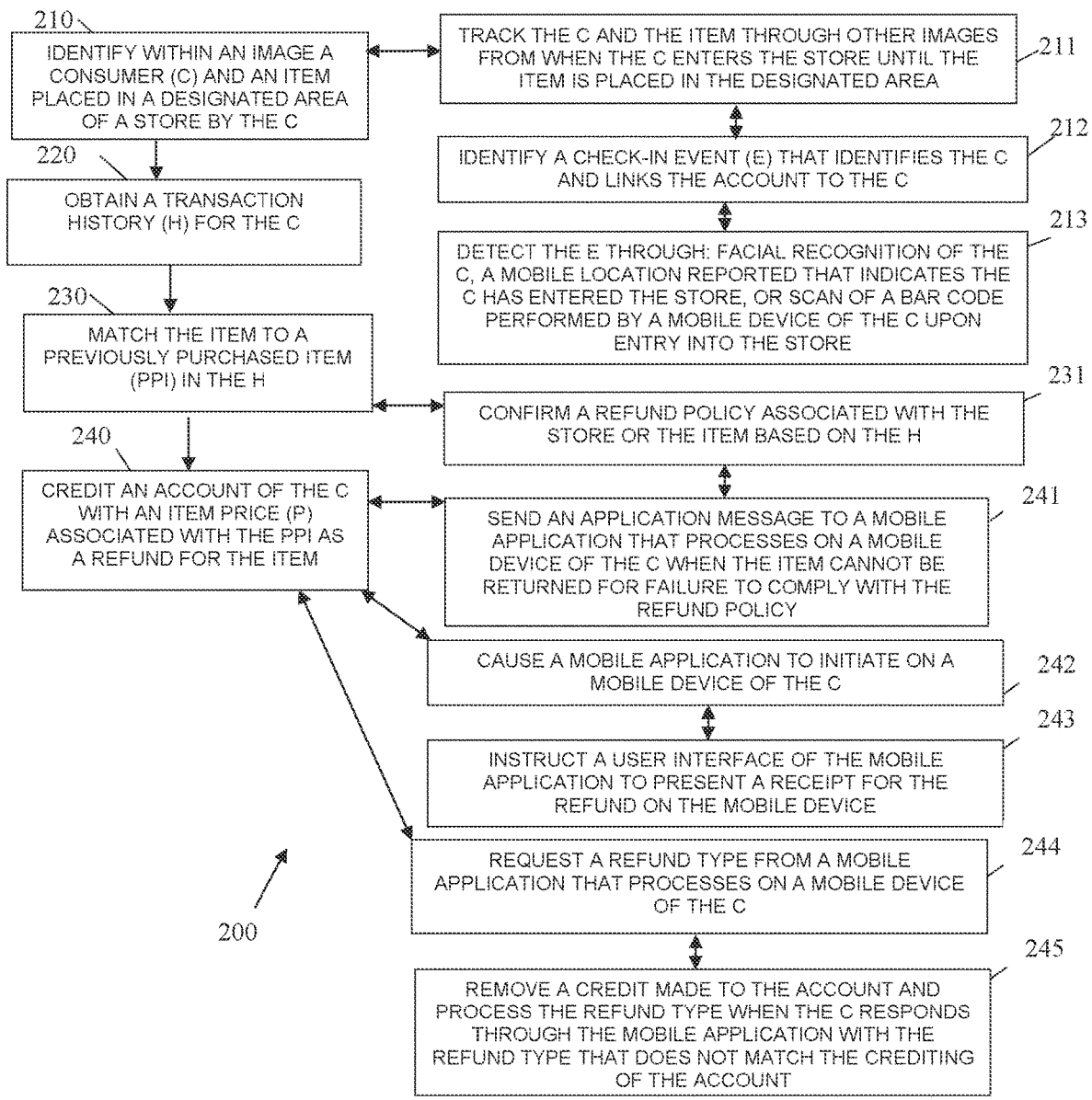
FIG. 2 is a diagram of a method for frictionless and unassisted refund processing, according to an example embodiment.

FIG. 2 is a diagram of a method 200 for frictionless and unassisted refund processing, according to an example embodiment. The software module(s) that implements the method 200 is referred to as a "frictionless refund manager." The frictionless refund manager is implemented as executable instructions programmed and residing within memory and/or a non-transitory computer-readable (processor-readable) storage medium and executed by one or more processors of a device. The processor(s) of the device that executes the frictionless refund manager are specifically configured and programmed to process the frictionless refund manager.

The frictionless refund manager has access to one or more network connections during its processing. The network connections can be wired, wireless, or a combination of wired and wireless.

In an embodiment, the device that executes the frictionless refund manager is the server 120. In an embodiment, the server 120 is a cloud-based server.

In an embodiment, the frictionless refund manager is all or some combination of: the item tracker 121, the person tracker 122, the pose tracker 123, the transaction manager 124, and/or the return/refund manager 125.

At 210, the frictionless refund manager identifies within an image a consumer and an item placed in a designated and camera-monitored are of a store.

In an embodiment, at 211, the frictionless refund manager tracks the consumer through other images from when the consumer enters the store until the item is placed in the designated area. The designated area can be a shelf, a bin, or a countertop.

In an embodiment of 211 and at 212, the frictionless refund manager identifies a check-in event that identifies the consumer and links an account to the consumer.

In an embodiment of 212 and at 213, the frictionless refund manager detects the check-in event through: facial recognition of the consumer, a mobile location reported for a mobile device operated by the consumer that indicates the consumer has entered the store, or a scan of a barcode performed by the mobile device of the consumer upon entry into the store.

At 220, the frictionless refund manager obtains a transaction history for the consumer.

At 230, the frictionless refund manager matches the item to a previously purchased item in the transaction history.

In an embodiment, at 231, the frictionless refund manager confirms a refund policy associated with the store or the item based on the transaction history detail.

At 240, the frictionless refund manager credits the account of the consumer with an item price associated with the previously purchased item as a refund for the item.

In an embodiment of 231 and 240, at 241, the frictionless refund manager sends an application message to a mobile application that processes on a mobile device of the consumer when the item cannot be returned for failure to comply with the refund policy.

In an embodiment, at 242, the frictionless refund manager causes a mobile application to initiate on a mobile device of the consumer.

In an embodiment of 242 at 243, the frictionless refund manager instructs a user interface of the mobile application to present a receipt for the refund on the mobile device.

In an embodiment, at 244, the frictionless refund manager requests a refund type from a mobile application that processes on a mobile device of the consumer. The refund type can include: a credit processed through a payment card, a cash refund, a prepaid gift card, virtual currency sent to a registered digital wallet of the consumer, or the credit made to the account at 240.

In an embodiment of 244 at 245, the frictionless refund manager removes the credit made to the account and processes the requested refund type when the consumer responds through the mobile application with the refund type that does not match the crediting of the store account at 240.

Figure 3:
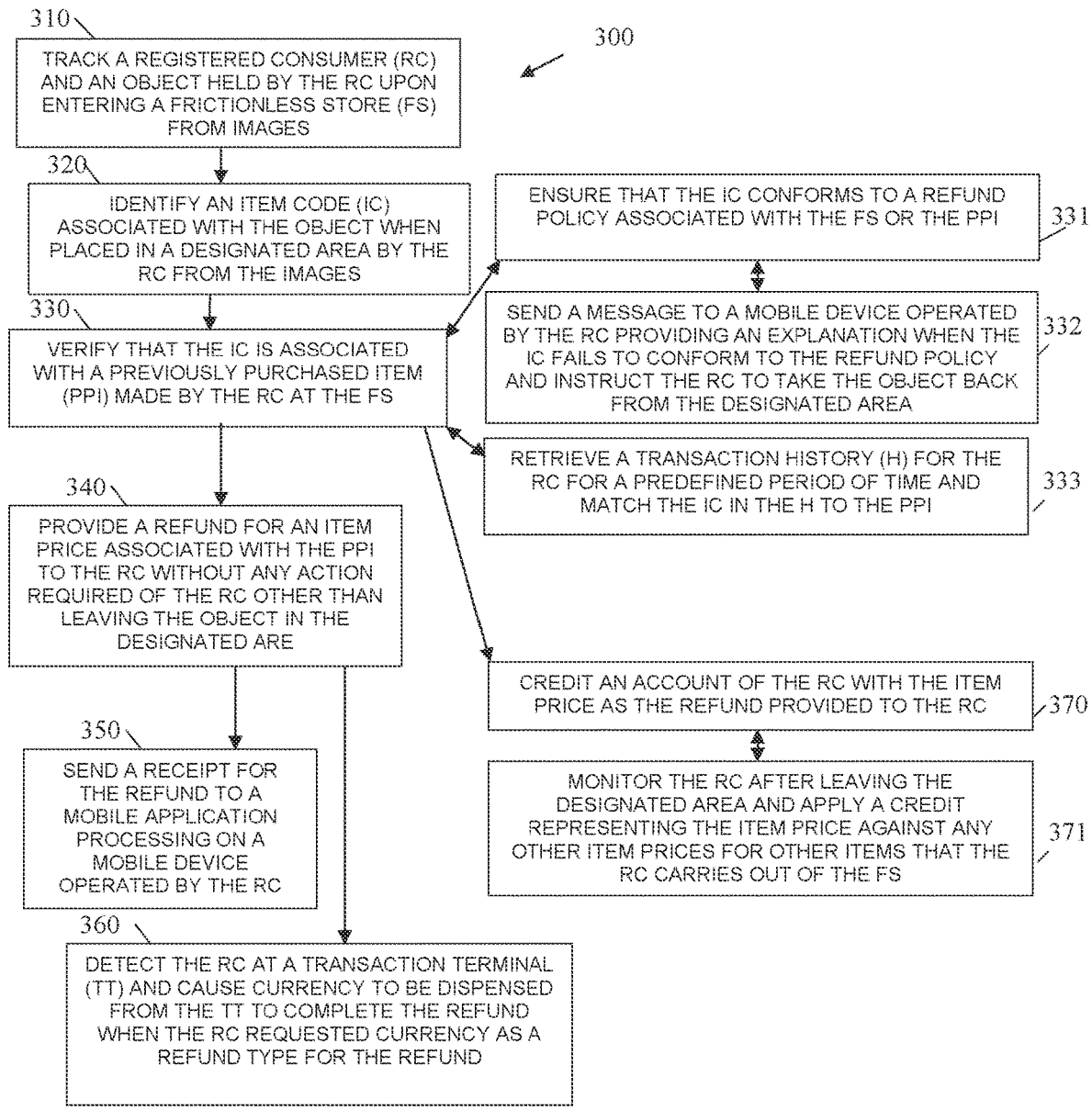
FIG. 3 is a diagram of another method for frictionless and unassisted refund processing, according to an example embodiment.

FIG. 3 is a diagram of another method 300 for frictionless and unassisted refund processing, according to an example embodiment. The software module(s) that implements the method 300 is referred to as an "unassisted return service."

The unassisted return service is implemented as executable instructions programmed and residing within memory and/or a non-transitory computer-readable (processor-readable) storage medium and executed by one or more processors of a device. The processors that execute the unassisted return service are specifically configured and programmed to process the unassisted return service. The unassisted return service has access to one or more network connections during its processing. The network connections can be wired, wireless, or a combination of wired and wireless.

In an embodiment, the device that executes the unassisted return service is the server 120. In an embodiment, the server 120 is a cloud processing environment.

In an embodiment, the unassisted return service is all of or some combination of: the item tracker 121, the person tracker 122, the pose tracker 123, the transaction manager 124, the return/refund manager 125, and/or the method 200.

The unassisted return service presents another and in some ways enhanced processing perspective of the method 200 discussed above.

At 310, the unassisted return service tracks a registered consumer and an object held by the registered consumer upon entering a frictionless store from images captured by cameras 110.

At 320, the unassisted return service identifies an item code associated with the object when placed in a designated area by the registered consumer from the images.

At 330, the unassisted return service verifies that the item code is associated with a previously purchased item made by the registered consumer at the frictionless store.

In an embodiment, at 331, the unassisted return service ensures that the item code conforms to a refund policy associated with the frictionless store or the previously purchased item.

In an embodiment of 331 and at 332, the unassisted return service sends a message to a mobile device operated by the registered consumer providing an explanation when the item code fails to conform to the refund policy and instructs the registered consumer to take the object back from the designated area.

In an embodiment, at 333, the unassisted return service retrieves a transaction history for the registered consumer for a predefined period of time and matches the item code in the transaction history to the previously purchased item.

At 340, the unassisted return service provides a refund for an item price associated with the previously purchased item to the registered consumer without action required of the registered consumer other than leaving the object in the designated area. There is no requirement of any interaction with a human agent or an electronic device to perfect the refund and return. The process is frictionless and unassisted.

In an embodiment, at 350, the unassisted return service sends a receipt for the refund to a mobile application that is processing on a mobile device operated by the registered consumer.

In an embodiment, at 360, the unassisted return service detects the registered consumer as being present at a transaction terminal through the images and causes currency (cash and/or coins) to be dispensed from the transaction terminal to complete the refund when the registered consumer requested the currency as a refund type for the refund through a mobile application on a mobile device operated by the registered consumer or automatically based on a profile setting in a profile linked to the account of the registered consumer.

In an embodiment, at 370, the unassisted return service credits an account of the registered consumer with the item price as the refund that is provided to the registered consumer.

In an embodiment, at 371, the unassisted return service monitors the registered consumer after leaving the designated area and applies a credit representing the item price against any other item prices for other items that the registered consumer carries out of the frictionless store.

Figure 4:
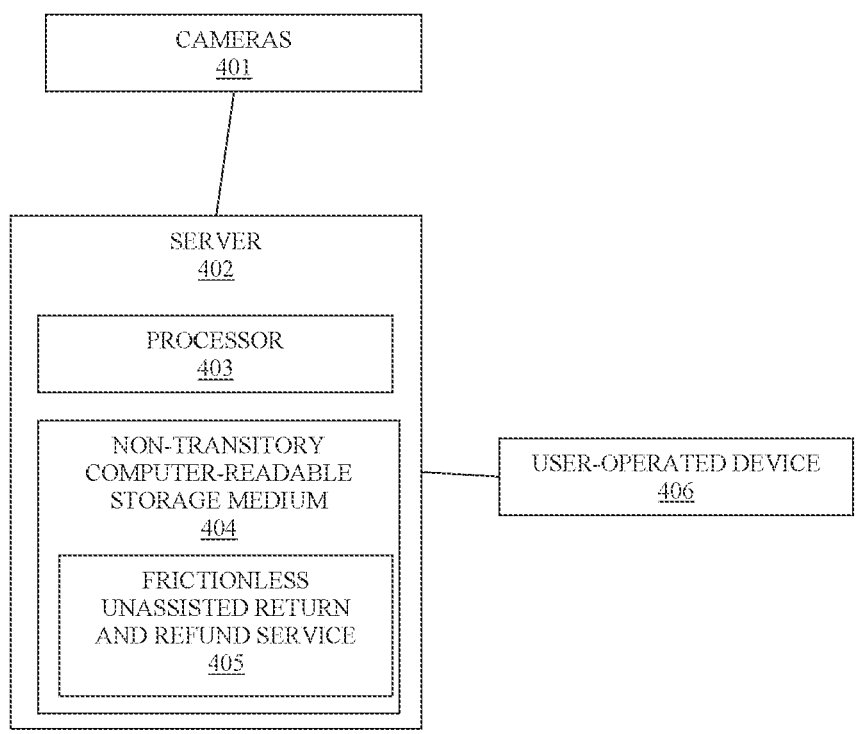
FIG. 4 is a diagram of a system for frictionless and unassisted refund processing, according to an example embodiment.

FIG. 4 is a diagram of a system 400 for frictionless and unassisted refund processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality of cameras 401, a server 402, and a user-operated device 406. The server 402 includes at least one hardware processor 403 and configured to execute executable instructions from a non-transitory computer-readable storage medium 404 as a frictionless unassisted return and refund service 405.

The frictionless unassisted return and refund service 405 when executed from the non-transitory computer-readable storage medium 404 on the processor 403 is configured to cause the processor to: identify an item placed in a designated area and associated with a registered consumer of a frictionless store as a returned item from the images; match an item code associated with the item to a previously purchased item from a transaction history linked to an account of the registered consumer; credit the account with an item price associated with the previously purchased item when the registered consumer is identified in the images as leaving the item in the designated area; and send a receipt for a credit of the item price made to the account to the user-operated device 406 operated by the registered consumer.

In embodiment, the frictionless unassisted return and refund service 405 when executed by the processor 403 from the non-transitory computer-readable storage medium 404 further causes the processor 403 to: reverse the credit and provide a refund for the item price in a manner defined by the registered consumer interacting with a mobile application interface that processes on the user-operated device 406.

In an embodiment, the frictionless unassisted return and refund service 405 is all or some combination of the: image tracker 121, the person tracker 122, the pose tracker 123, the transaction manager 124, the return/refund manager 125, the method 200, and/or the method 300.

In an embodiment, the server 402 is a cloud-based processing environment.

In an embodiment, the user-operated device 406 is: a mobile phone, a tablet, or a wearable processing device (such as a smart watch).

In an embodiment, the system 400 is deployed as a portion of a frictionless store implementation where customers (individuals) shop through computer-vision and image processing and items and individuals are associated with one another with a shopping cart maintained for each individual. Each individual can checkout and pay for his/her shopping cart items using any of the above-referenced techniques discussed with the FIG. 1. The frictionless store may be associated with or included within a traditional store as discussed above. That is, a traditional store can be equipped with the system 400 in all or a portion of the traditional store that includes POS terminals and SSTs as transaction terminals 140.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, performed by a server that comprises a set of trackers including an item tracker, a person tracker, and a pose tracker, the method comprising:

tracking a registered consumer and an item held by the registered consumer upon entry of the registered consumer into a frictionless store, wherein the item is a potential item associated with the frictionless store, wherein tracking the registered consumer comprises controlling a camera to capture images of the registered consumer, at least one image capturing the registered consumer placing the item in a designated area of the frictionless store;

performing, using the person tracker, image recognition on the images, wherein the image recognition causes the registered consumer to be identified and distinguished from at least one other consumer;

identifying, using the pose tracker, limbs of the registered consumer in successive frames of the images;

tracking, using the set of trackers, the limbs of the registered consumer and the item across consecutive frames of the images;

monitoring, using the set of trackers, a bounding box placed around the registered consumer within the images to enable identification of attributes associated with the registered consumer;

identifying, using the person tracker and the pose tracker, a direction of movement of the registered consumer within the frictionless store;

determining, using the item tracker in cooperation with the pose tracker, an item identifier associated with the item, based on the tracking of the identified limbs of the registered consumer and the item across successive frames;

assigning an item code associated with the item identifier when the item is placed in the designated area of the frictionless store by the registered consumer;

verifying that the item code is associated with a previous purchase made by the registered consumer at the frictionless store; and processing a refund for an item price associated with the previous purchase, without any action required of the registered consumer, by automatically crediting an account of the registered consumer.

2. The method of claim 1 further comprising:
sending a receipt for the refund to a mobile application processing on a mobile device operated by the registered consumer.

3. The method of claim 1 further comprising:
detecting the registered consumer at a transaction terminal; and
causing currency to be dispensed from the transaction terminal to complete the refund when the registered consumer has requested currency as a refund type for the refund.

4. The method of claim 1, wherein processing the refund further includes monitoring the registered consumer after leaving the designated area, and applying a credit representing the item price against any other item prices for other items that the registered consumer carries out of the frictionless store by using the account that was credited the refund.

5. The method of claim 1, wherein verifying further includes ensuring that the item code conforms to a refund policy associated with the frictionless store or the previous purchase.

6. The method of claim 5, wherein ensuring further includes sending a message to a mobile device operated by the registered consumer providing an explanation when the item code fails to conform to the refund policy, and instructing the registered consumer to take the item back from the designated area.

7. The method of claim 1, wherein verifying further includes retrieving a transaction history for the registered consumer for a predefined period of time, and matching the item code in the transaction history to the previous purchase.

8. The method of claim 1, wherein processing the refund further includes instructing the registered consumer through a user interface of a mobile device operated by the registered consumer to travel to a transaction terminal of the frictionless store to receive the refund.

9. The method of claim 8 further comprising:
detecting the registered consumer standing in front of the transaction terminal through at least one of the images; and
instructing the transaction terminal to dispense a cash and coin amount for the refund to the registered consumer.

10. The method of claim 1, wherein tracking the registered consumer further includes identifying a second item picked up by the registered consumer before reaching the designated area, and obtaining second item information for the second item.

11. The method of claim 10, wherein processing the refund further includes applying a credit amount equal to the refund against a price associated with the second item based on the second item information and updating the account accordingly.

* * * * *